United States Patent [19]

Dudley

[11] 4,159,163
[45] Jun. 26, 1979

[54] COMPACT OPTICAL ASSEMBLIES FOR POLARIZED LIGHT PROJECTION SYSTEMS

[76] Inventor: Leslie P. Dudley, 11088 Ophir Dr., #307, Los Angeles, Calif. 90024

[21] Appl. No.: 740,252

[22] Filed: Nov. 10, 1976

Related U.S. Application Data

[63] Continuation of Ser. No. 629,899, Nov. 7, 1975, abandoned.

[51] Int. Cl.$^2$ ............................................. G02B 27/26
[52] U.S. Cl. ..................................... 350/144; 352/86; 353/10
[58] Field of Search ...................... 350/78–79, 350/132, 144, 84, 69, 175 TS, 183; 353/7–10; 352/57, 60, 86

[56] References Cited

U.S. PATENT DOCUMENTS

| 1,651,493 | 12/1927 | Warmisham | 350/78 |
| 2,241,041 | 5/1941 | Sauer | 353/8 |
| 2,437,775 | 3/1948 | Williams | 350/79 |
| 3,264,934 | 8/1966 | Matagne | 350/132 |

FOREIGN PATENT DOCUMENTS

254706 10/1964 Australia ......................................... 353/8

OTHER PUBLICATIONS

Topics "Spacial Projection", Photography, 11-1962, p. 9.
"Mathieu, J. P. Optics", Pergamon Press, 1975, p. 98.

Primary Examiner—John K. Corbin
Assistant Examiner—Wm. H. Punter
Attorney, Agent, or Firm—Keith D. Beecher

[57] ABSTRACT

Optical assemblies are disclosed for use in producing an effect of three-dimensional relief in the projection of a still photograph or motion picture film by means of polarized light, each still photograph or frame of the motion picture film comprising a single, regular, two-dimensional image. In order to produce the effect of three-dimensional relief the projector is provided with an optical assembly consisting of a lens and a beam-splitting polarizing device located inside the lens barrel which results in the projection of two oppositely polarized and laterally separated images of the photograph or each frame of motion picture film. The screen is of the non-depolarizing type and the images are seen in three-dimensional relief when viewed through polarizing spectacles.

5 Claims, 8 Drawing Figures

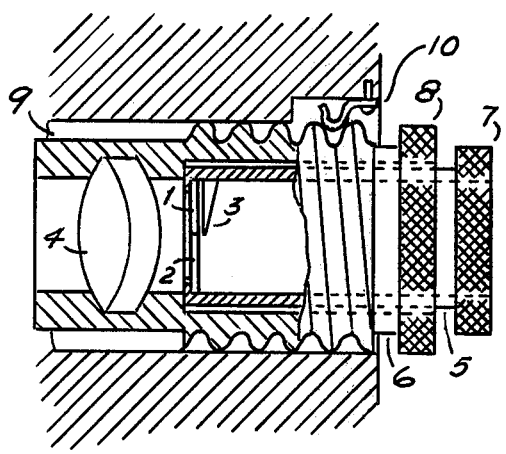 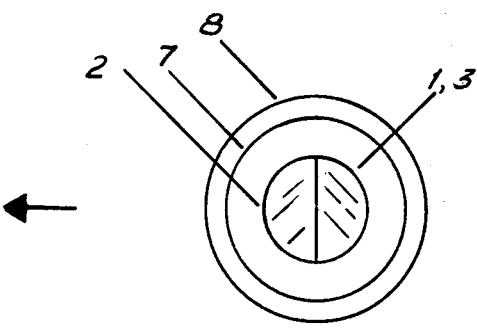
FIG. 1a  FIG. 1b
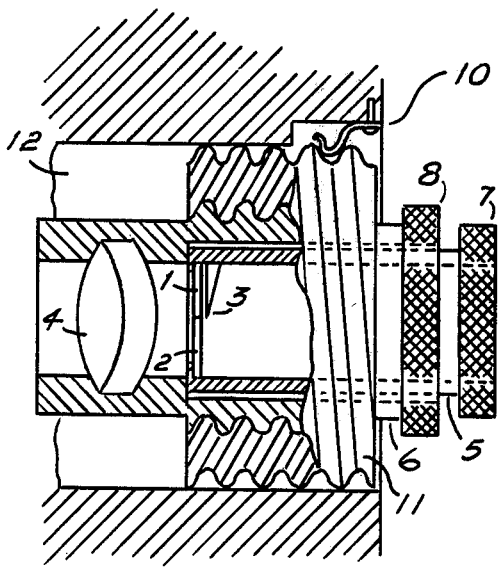 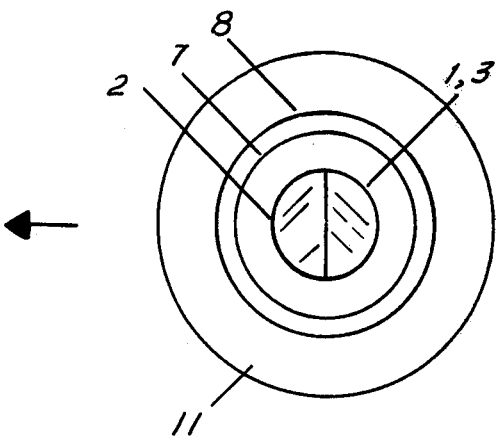
FIG. 2a  FIG. 2b

COMPACT OPTICAL ASSEMBLIES FOR POLARIZED LIGHT PROJECTION SYSTEMS

This application is a continuation of Copending Application Ser. No. 629,899, filed Nov. 7, 1975 now abandoned. Application Ser. No. 518,355 filed in the name of the present inventor on Oct. 29, 1974, now abandoned, is also related to the subject matter herein.

BACKGROUND OF THE INVENTION

The earlier applications mentioned above describe various beam-splitting polarizing systems three of which involve the use of prisms. These three arrangements may be summarized as follows:

1. The beam-splitting or light deviating means comprises a single, narrow-angle prism so located that it occupies one-half of the field of the projection lens, its apex edge being parallel to and adjacent the vertical diameter of the lens. The light polarizing means comprises two pieces of sheet polarizing material each of which occupies one-half of the field of the projection lens, the polarizing axes of the two pieces being mutually perpendicular and the two pieces being butted together so that the line of demarkation between them is parallel to and adjacent the vertical diameter of the projection lens.

2. The beam-splitting or light deviating means and the polarizing means are combined in the form of a single, narrow-angle, birefringent prism located adjacent the projection lens and occupying the complete field of the lens so that one of the two projected images is formed by ordinary rays and the other image is formed by extraordinary rays, the polarizing axes of the two sets of rays being mutually perpendicular.

3. The beam-splitting or light deviating means and the polarizing means are combined in the form of two prism components of birefringent material cemented together to constitute a plane-parallel plate in which the optic axes of the two component prisms are mutually perpendicular and parallel to the parallel faces of the plate. The device is located adjacent the projection lens and occupies the complete field of the lens so that one of the two projected images is formed by ordinary rays and the other image is formed by extraordinary rays, the polarizing axes of the two sets of rays being mutually perpendicular.

In each of these three arrangements the polarizing means is so mounted that it can be rotated through 180° about the optical axis of the projection lens thus causing the polarizing axes of the two projected images to be interchanged. By this means the apparent position of the image seen through polarizing spectacles can be shifted from behind the screen to in front of the screen or vice versa.

The present invention is concerned with specific embodiments of the principles summarized above and has for its object the solution of two problems which arise in practice. The first of these problems lies in the fact that with many of the projectors being manufactured today, particularly those for the amateur or home movie market, the lens is recessed into the body of the projector in such a way that there is little clearance between the front of the lens and the projector housing, thus making it difficult, if not impossible, to attach any auxiliary optical device to the lens. The second problem arises from the fact that most projectors currently being manufactured for the home movie market are provided with zoom lenses, and such lenses cannot be used satisfactorily with optical systems of the types with which this invention is concerned. This is because, when the optical device is placed in front of a zoom lens, it is too distant from the exit pupil of the rear element. The effect is the same as that resulting from placing the device too far in front of a regular lens of fixed focal length. This so-called proximity effect is discussed in some detail in my earlier application, referenced above. Both of these problems are solved in accordance with the present invention by providing a compact optical assembly consisting of a projection lens of fixed focal length together with light deviating and polarizing means located inside the lens barrel.

For a proper understanding of the invention it is important to note a major difference between the light-deviating means employed in this case and the light-deviating means used in earlier systems for the projection of films each frame of which contains a pair of stereoscopically related images, each of these images occupying one-half of the film frame.

In the case of the present invention, the projected pictures comprise two similar, overlapping but laterally displaced, pictures of a single image which occupies the entire film frame. It is unnecessary for the lateral displacement of the projected images at the screen surface ever to be appreciably in excess of the human interocular separation, that is, say, in excess of about three inches. This means, in practice, that the deviation produced by the single prism employed needs to be only about 0° 06′ for long projector-to-screen distances, such as 100 feet, or 1° 00′ for short projector-to-screen distances, such as 10 feet. As explained in detail in Copending Application Ser. No. 518,355, filed on Oct. 29, 1974, the light-deviating and polarizing means must be located as close to the front of the lens as possible in order that the proximity effect may be a maximum.

Referring, now, to the earlier systems involving the projection of two half-frame images, the angular deviation produced by the prisms is necessarily of much greater magnitude. The deviation must be equal to one-half the field angle of the projection lens. Thus, for example, if the field angle is 12°, the angular deviation must be 6°, regardless of the projector-to-screen distance. So large a deviation cannot be produced by means of a single prism located in one-half of the lens field; this is because the deviated image would suffer from severe chromatic aberration and because its horizontal dimension would be unduly compressed, thereby rendering binocular fusion of the two projected images impossible for an observer to accomplish. Consequently, it is necessary to employ two prisms, one in each half of the lens field, each prism producing, in opposing directions, an angular deviation equal to one-quarter of the field angle of the projection lens. The two prisms, together with the polarizers, should be located as far from the front of the lens as possible in order that the proximity effect may be a minimum. Typically, in the case of a lens having a field angle of approximately 12°, for use with 16 mm film, the distance of the prisms and the polarizers from the front of the lens should be about one foot. If the prisms and polarizers be located too close to the front of the lens, then, in addition to the wanted, overlapping stereoscopic pair of images, two unwanted, spurious images will be projected, one on each side of the wanted stereoscopic pair. In order to eliminate these spurious images, it is necessary to insert an additional pair of polarizers in the film gate of the projector; this is a physical impossibility without a projector specially designed for the purpose. Thus, it will be obvious that a system for projecting half-frame stereoscopic pairs cannot be manufactured in the form of a compact optical assembly as described herein.

BRIEF DESCRIPTION OF THE DRAWINGS

FIGS. 1a and 1b show a form of optical assembly in accordance with the invention;

FIGS. 2a and 2b show a modification of the assembly shown in FIG. 1;

DETAILED DESCRIPTION OF THE ILLUSTRATED EMBODIMENTS

Figures 3A, 3B:
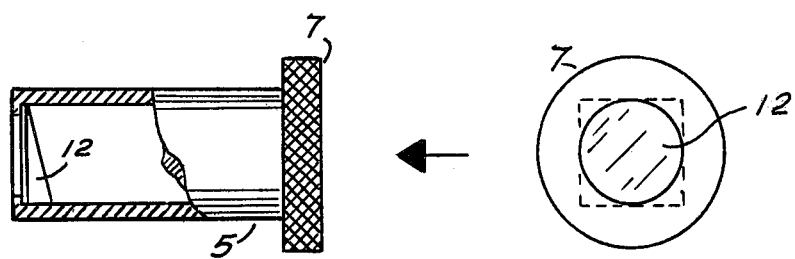
FIGS. 3a and 3b show an alternative type of light deviating and polarizing device which can be substituted for the light deviating and polarizing device included in FIGS. 1 and 2.

Referring, first, to FIG. 1a, the drawing shows a plan view, partly in section, of a complete optical assembly according to the invention. FIG. 1b shows an end elevation of the assembly as viewed in the direction indicated by the arrow head. Details 1 and 2 represent pieces of sheet polarizing material oriented with their polarizing axes mutually perpendicular, and 3 represents a narrow-angle prism the apex edge of which is adjacent the vertical diameter of the projection lens 4, which is preferably of the single-component type. The two polarizers and the prism are mounted inside the cylinder or barrel 5 which is a smooth sliding fit inside the lens barrel 6. Rotation of the polarizers and the prism to the desired position is accomplished by turning the knurled rim or flange 7 on the barrel 5.

Thus, for projection, the barrel 5 must be rotated to a position such that the line of demarkation between the polarizing filters 1 and 2, and, consequently, the apex edge of the prism 3, are both in a vertical position. Rotation of the barrel 5 through an angle of 180° from this position will then cause the polarizing axes of the two images to be interchanged, i.e., shifted through 90°. By this means the apparent position of the image seen through polarizing spectacles can be shifted from behind the screen to in front of the screen or vice versa.

Focusing is accomplished by turning the knurled rim or flange 8 on the barrel 6; this causes the barrel 6 to move longitudinally as a result of the engagement of the threaded portion of the barrel with the spring 10 which is attached to the inside of the lens tube or recess 9 in the projector. The method of focusing illustrated is representative of common practice and does not constitute a part of the invention. The popularity of the method is due to the fact that, provided that the diameter of the lens barrel, measured to the top of the threaded portion, is appropriate for the projector with which the lens is to be used, the pitch of the thread is immaterial. This facilitates the use of lenses of different makes and types with the same projector.

Interchangeability of lenses is further factiliated by means of a feature of the present invention as illustrated in FIGS. 2a and 2b. The drawings show views of the same type as those in FIGS. 1a and 1b and depict the same optical assembly. However, the diameter of the lens tube or recess 9 in FIG. 1a has been increased in FIG. 2a as indicated by 12. In order to permit the same optical assembly to be used, the effective outer diameter of the lens barrel 6 has been increased by means of an internally and externally threaded sleeve 11 which is screwed on to the threaded portion of the lens barrel. The sleeve can be retained in position on the lens barrel by means of a grub screw (not shown) or by the simple expedient of making it a tight fit. This feature of the invention results in a substantial reduction in manufacturing costs. For example, in the case of the most popular types of movie projectors designed for use with 8 mm and Super 8 mm film, lens barrel diameters range from ¾ inch up to 1¼ inch through two or three intermediate sizes. Hence, if the basic optical assembly be provided with a ¾ inch diameter barrel, it can be used with the vast majority of 8 mm and Super 8 mm projectors simply by fitting a threaded sleeve, as just described, in those cases where this is necessary.

FIGS. 3a and 3b show the cylinder or barrel 5 of the earlier drawings, but the sheet polarizers 1 and 2 and also the prism 3 have now been replaced by alternative light deviating and polarizing means, the said means comprising the prism 12 which is fabricated from birefringent crystal material as hereinbefore mentioned. When this alternative unit is inserted in the lens barrel 6 the prism 12 occupies the complete field of the lens 4 as will be understood. In FIG. 3b the prism 12 is represented by broken lines as having a square periphery. This configuration is not dictated by optical considerations but by the fact that it is easier to fabricate birefringent prisms of this shape.

Figures 4A, 4B:
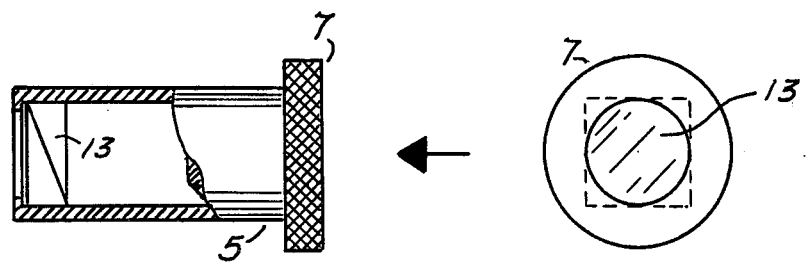
FIGS. 4a and 4b show a further alternative light deviating and polarizing device which can be substituted for the light deviating and polarizing device included in FIGS. 1 and 2.

FIGS. 4a and 4b are similar to FIGS. 3a and 3b except that, as indicated by 13, the single birefringent prism 12 has now been replaced by two prism components of birefringent material cemented together to constitute a plane-parallel plate in which the optic axes of the two component prisms are mutually perpendicular and parallel to the parallel faces of the plate, again as hereinbefore mentioned.

The invention having been fully described, it is understood that it is not to be limited to the details herein set forth, but is of the full scope of the sppended claims.

What is claimed is:

1. An optical assembly for use in polarized light projection systems for the projection of a photograph or the like onto a projection screen comprising: a first barrel, a single-component projection lens mounted in said first barrel in a position adjacent the rear of the barrel, a second barrel coaxial with said first barrel in a smooth, sliding, rotatable fit inside the first barrel, and light-deviating and polarizing means located inside the second barrel at that end of said second barrel which is adjacent the lens for projecting two oppositely polarized, overlapping but laterally displaced, images of the complete photograph onto the projection screen, the angular deviation produced by the light-deviating means being substantially between an upper limit of one degree and a lower limit of one-tenth of one degree, rotation of the second barrel containing the light-deviating and polarizing means through an angle of 180° from either one of the two correct positions required for projection causing the polarizing axes of the two projected images to be interchanged, that is, shifted through 90°.

2. An optical assembly according to claim 1 in which the light deviating and polarizing means comprises a single, narrow-angle prism so located that it occupies one-half of the field of the projection lens, together with two pieces of sheet polarizing material each of which occupies one-half of the field of the projection lens, the polarizing axes of the two pieces being mutually perpendicular and the two pieces being butted together so that the line of demarkation between them is parallel to and adjacent the apex edge of the prism which extends across the diameter of the projection lens.

3. An optical assembly according to claim 1 in which the light deviating and polarizing means are combined in the form of a single, narrow-angle birefringent prism occupying the complete field of the projection lens so that one of the two projected images is formed by ordinary rays and the other image is formed by extraordinary rays, the polarizing axes of the two sets of rays being mutually perpendicular.

4. An optical assembly according to claim 1 in which the light deviating and polarizing means are combined in the form of two prism components of birefringent material cemented together to constitute a plane-parallel plate in which the optic axes of the two component prisms are mutually perpendicular and parallel to the parallel faces of the plate which occupies the complete field of the projection lens so that one of the two projected images is formed by ordinary rays and the other image is formed by extraordinary rays, the polarizing axes of the two sets of rays being mutually perpendicular.

5. An optical assembly according to claim 1 in which said first lens barrel has a threaded portion, and in which the effective diameter of the first lens barrel is increased by means of an internally and externally threaded sleeve which is screwed on to the threaded portion of the said first lens barrel.

* * * * *